United States Patent [19]

Hanke et al.

[11] Patent Number: 4,909,599

[45] Date of Patent: Mar. 20, 1990

[54] MOUNT FOR OPTICAL LENS ELEMENTS

[75] Inventors: Peter Hanke, Eichenau; Rolf-Dietrich Grimminger, Oberschleissheim, both of Fed. Rep. of Germany

[73] Assignee: Optische Werke G. Rodenstock, Munich, Fed. Rep. of Germany

[21] Appl. No.: 347,269

[22] Filed: May 4, 1989

[30] Foreign Application Priority Data

May 5, 1988 [DE] Fed. Rep. of Germany ....... 3815372

[51] Int. Cl.$^4$ ................................................ G02B 7/02
[52] U.S. Cl. .................................................... 350/252
[58] Field of Search ............... 350/252, 253, 255, 241, 350/242, 243, 244, 245, 247

[56] References Cited

U.S. PATENT DOCUMENTS 3,070,389 12/1962 Baur et al. ........................... 350/252
4,268,123 5/1981 Mesco ................................. 350/253

Primary Examiner—Rodney B. Bovernick
Assistant Examiner—Loha Ben
Attorney, Agent, or Firm—Antonelli, Terry & Wands

[57] ABSTRACT

A mount for optical lens elements or the like, with a retaining ring arranged in a mount body and holding a lens element in the mount. To obtain uniform contact pressure in the lens element and avoid exertion of a torque during mounting of the retaining ring in the mount body, openings are provided along an outer peripheral zone of the retaining ring, with the openings penetrating in the preferably cylindrical peripheral surface of the retaining ring. Setscrews oriented parallel to the element axis are located in the openings to be rotatable and held toward the lens element. The setscrews enter into the mount body with their thread zone projecting out of the peripheral surface of the retaining ring.

4 Claims, 1 Drawing Sheet

4,909,599

MOUNT FOR OPTICAL LENS ELEMENTS

BACKGROUND OF THE INVENTION

The present invention relates to a mount for optical lens elements or the like which includes a retaining ring arranged in a mount body and holding the lens in the mount.

A mount of the aforementioned type is proposed in, for example, German DOS 3,521,640 wherein a lens element is held in the mount in an axial direction between an axial support and a retaining ring, with the retaining ring being fashioned as a locking engaging into a thread in the mount body.

A disadvantage of the above proposed mount resides in the fact that by virtue of the threaded tightening of the retaining ring, a torque is exerted on the lens element thereby frequently resulting in an undesirable eccentricity effect on the lens element. Moreover, when using a rigid locking ring, a uniform contact pressure of the lens element against the axial support is not insured due to unavoidable thread tolerances.

The aim of the present invention essentially resides in providing a mount of the aforementioned type wherein a uniform contact pressure of the lens element is achieved and no torque is exerted during a fastening of the retaining ring in the mount body.

In accordance with advantageous features of the present invention, openings are provided on an outer peripheral zone or area of the retaining ring, with the openings penetrating a preferably cylindrical peripheral surface of the retaining ring, and setscrews, disposed axially parallel to the lens element, are arranged in the openings to be rotable and held toward the lens element. The setscrews with their threaded zones or areas projecting out of the peripheral surface of the retaining ring engaging into the mount body.

For holding a lens element or the like, according to the present invention, a retaining ring is provided having several and, preferably, at least three openings fashioned as blind bores, with the openings being located in an end face of the retaining ring facing away from the lens element, at mutually spaced locations. The openings penetrate the peripheral surface of the retaining ring in such a manner that the slit-like windows are arranged in the perpheral surface. A setscrew can be inserted in each opening axially and parallel to the lens element axis. A threaded zone of the setscrew projects out of the peripheral surface of the retaining ring and engages into the mount body. With such an arrangement, the setscrew is held in place, that is, it contacts at least partial regions of the wall and rests on a bottom of the opening. However, the setscrew does not engage into the retaining ring and thus is rotatable in the latter.

In accordance with still further features of the present invention, the retaining ring is not threaded in a peripheral surface facing the mount body; therefore, in order to fix the lens in place, the retaining ring is placed into the mount body and onto the lens element. Thereafter, the setscrews are introduced by threading into the openings. During this step, it has been found to be especially advantageous to urge the retaining ring, after insertion, against the lens element with a defined axial force and, while maintaining this pretensioning force, the setscrews are threaded in place up to abutment.

By virtue of the fixing of the lens element or the like in a mount in the manner proposed by the present invention, laterally acting shearing forces are avoided and azimuthally uniform contact pressure is obtained. While the cross-section of the opening can be of various configurations, it is merely required that a setscrew is guided in the respective opening so that engagement of the setscrew into the mount body is ensured and secured. However, an opening can be produced in a particularly simple manner by drilling so that the opening has a cylindrical or circular cross-section.

According to the present invention, the angular spacing between the openings may be constant and, depending upon the diameter of the lens element, a varying number of openings may be provided. For example, with a lens element diameter of up to 18 mm, it is possible to provide three openings and setscrews with an angular spacing of 120°, and with a lens element diameter of between 120 and 150 mm, nine openings and setscrews with an angular spacing of 40° may be provided. For a lens element diameter of between 225 and 250 mm, twenty openings and setscrews with an angular spacing of 18° are preferable.

In accordance with the preferred embodiment of the present invention, the mount body has, in a region adjacent to the retaining ring a profiling that extends all around and is correlated with a thread of the setscrews. The profiling may, for example, be a thread or serration running in a peripheral direction of the mount. The profile of the setscrew and the profiling in the mount body are mutually associated.

In accordance with still further advantageous features of the present invention, it has been found advantageous to provide the setscrew with threads that are self-tapping in the material of the mount body.

The above and other objects, features, and advantages of the present invention will become more apparent from the following description when taken in connection with the accompanying drawings.

DETAILED DESCRIPTION

Figure 1:
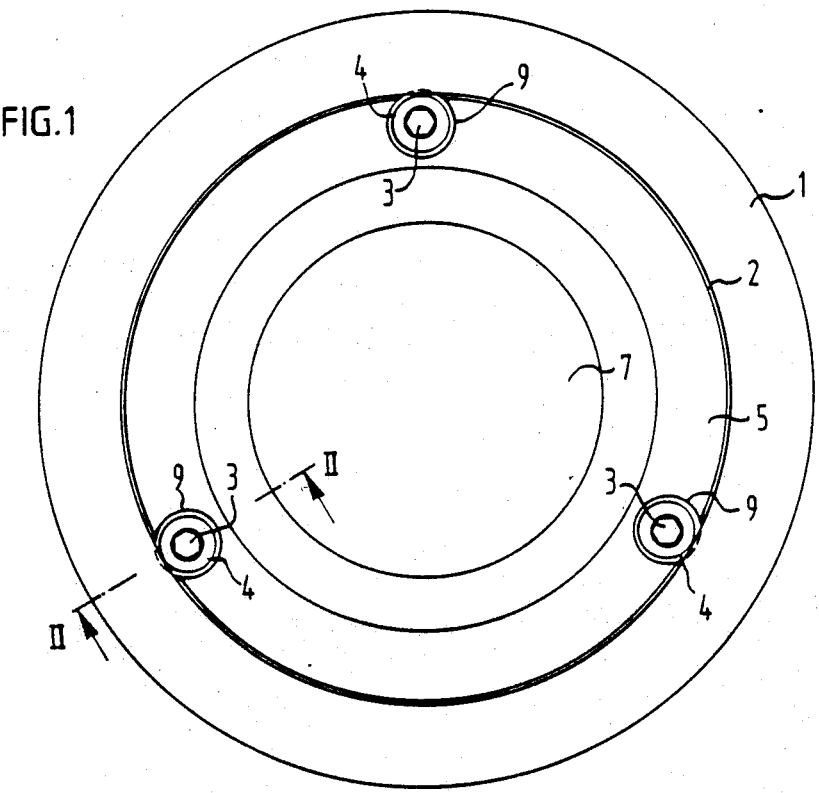
FIG. 1 is a top view of a mount constructed in accordance with the present invention with three openings in the retaining ring.
Figure 2:
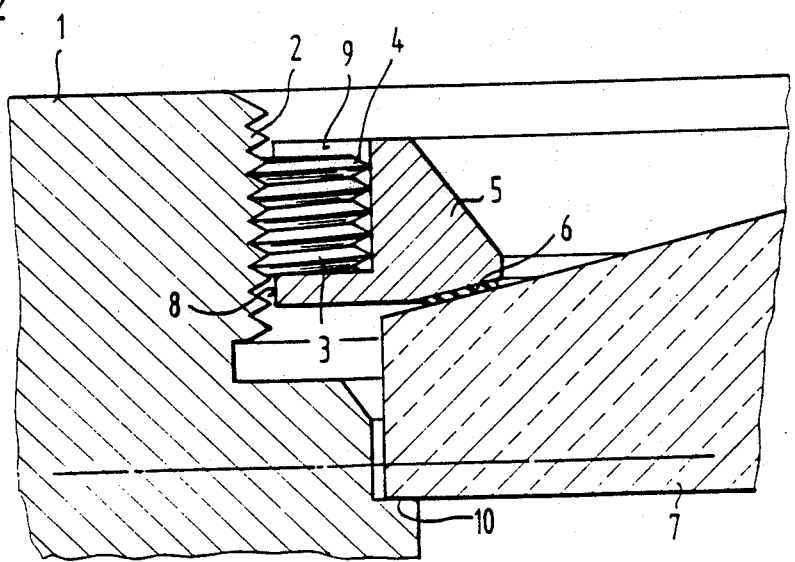
FIG. 2 is a cross sectional view taken along the line II—II in FIG. 1.

Referring now to the drawings wherein like reference numerals are used throughout the various views to designate like parts, and, more particularly, according to FIGS. 1 and 2, a lens element 7 rests on an axial support 10 of the mount body, with the lens element 7 being retained between the support 10 and a retaining ring 5 which extends over a marginal zone of the lens element 7 on a side of the lens element 7 lying in opposition to the support 10. According to the invention, the retaining ring is not designed as a locking ring but rather has a substantially smooth peripheral surface 8 which, in the illustrated embodiment, is cylindrical.

As shown most clearly in FIG. 1, three openings 9 are arranged on the outer peripheral zone of the retaining ring 5 with the three openings 9 having an angular spacing of 120°. The openings 9 are located on the outer peripheral range of the retaining ring 5 and penetrate the cylindrical peripheral surface 8 in such a manner that slit-like windows are provided in the peripheral surface.

A setscrew 3 with a thread 4 is arranged in each of the openings 9, with each of the openings 9 having a circular cross-sectional area so that the setscrew or threaded pin 3 with a threaded portion 4 is in contact with the wall of the opening 9 and engages with its threaded portion projecting through the window in the peripheral surface away from the latter into the mount body 1.

In the illustrated embodiment, as shown most clearly in FIG. 2, the mount body 1 has a continuous thread 2 in a zone adjacent to the retaining ring 5, with the thread 2 being correlated with the thread 4 of the setscrew 3. Elastic ribs 6 of, for example, silicone, are arranged in a region of the setscrews 3 between the retaining ring 5 and the lens element 7.

In order to fix the lens element 7 in place, the retaining ring 5 is inserted in the mount body 1, and the retaining ring 5 is urged against the lens element 7 with a defined axial force. While maintaining this pretensioning force, the setscrews 3 are threaded in the openings 9 until an abutment takes place. As noted hereinabove, depending upon the lens element diameter, the openings 9 may vary in number from, for example, 3, 6, to as many as 20 or more.

While we have shown and described only one embodiment in accordance with the present invention, it is understood that the same is not limited thereto but is susceptible to numerous changes and modifications as known to one of ordinary skill in the art, and we therefore do not wish to be limited to the details shown and described herein, but intend to cover all such modifications as are encompassed by the scope of the appended claims.

We claim:

1. A mount for optical lens elements or the like, the mount comprising a mount body, a retaining ring means arranged in the mount body for holding a lens element in the mount, a plurality of openings provided along an outer peripheral zone of the retaining ring means, said openings extending through a preferably cylindrical peripheral surface of the retaining ring means, fastening means disposed in parallel to the lens element axis and being respectively disposed in the openings so as to be rotatable while being held toward the lens element, said fastening means includes a thread zone projecting out of the peripheral surface of the retaining ring means and engaging into the mount body.

2. A mount according to claim 1, wherein the mount body includes a continuous profiling in a zone adjacent to the retaining ring means, said profiling being associated with the thread zone of the fastening means.

3. A mount according to claim 1, wherein the thread zone of the fastening means includes threads which are self-tapping in the material of the mount body.

4. A mount according to claim 1, wherein the fastening means includes setscrews.

* * * * *